United States Patent Office 3,752,703
Patented Aug. 14, 1973

3,752,703
PROPELLANT MIXTURE COMPRISING DIFLUOROBROMINIUM TETRAFLUOROBORATE OXIDIZER COMPONENT
Madeline S. Toy, Fountain Valley, and William A. Cannon, Costa Mesa, Calif., assignors to the United States of America as represented by the Secretary of the Army
No Drawing. Original application July 19, 1968, Ser. No. 745,984, now Patent No. 3,645,702. Divided and this application Nov. 13, 1970, Ser. No. 89,520
Int. Cl. C06d 5/06
U.S. Cl. 149—19                                         1 Claim

ABSTRACT OF THE DISCLOSURE

Propellant mixture comprising difluorobrominium tetrafluoroborate oxidizer in combination with binder and fuel components.

---

This application is a division of application Ser. No. 745,984 filed July 19, 1968, now Pat. 3,645,702.

This invention relates to a novel compound and method of preparation thereof, and more particularly to difluorobrominium tetrafluoroborate.

It is an object of this invention to provide and disclose a novel compound having utility as a solid oxidizer component in a propellant system.

Other objects and a fuller understanding of the invention may be ascertained from the following description and claims.

We have prepared difluorobrominium tetrafluoroborate by bubbling gaseous boron trifluoride through liquid bromine trifluoride at room temperature. The rapid initial gas absorption is accompanied by an exothermic reaction. The product is recovered by evaporation to dryness under a vacuum at room temperature.

In the alternative, gaseous boron trifluoride in excess is condensed on top of frozen bromine trifluoride at liquid nitrogen temperature. The mixture is slowly warmed to room temperature. The product is recovered by evaporation to dryness under a vacuum at room temperature.

A white residue having a melting point of 180° C. was obtained. The infrared spectrum of a thin solid film of the product showed a strong broad band in the region 1020–1100 cm.$^{-1}$ indicative of the tetrafluoroborate ion. This band was also observed for $KBF_4$, $NaBF_4$, $RbBF_4$; $NOBF_4$, $NO_2BF_4$, $NH_4BF_4$ and $SF_3BF_4$. The product was analyzed. Calculated for $BrF_2BF_4$ (percent): F, 55.69; Br, 39.04 and B, 5.33. Found (percent): F, 55.37 and B, 5.91.

Difluorobrominium tetrafluoroborate has utility as an oxidizer component in a rocket propellant in conjunction with a fuel component and a binder. Suitable fuel components within the scope of this invention include pentaborane ($B_5H_9$), monomethyl hydrazine, hydrazine and unsymmetrical dimethyl hydrazine. Suitable binders include certain natural and synthetic resins, e.g., butadiene-styrene and butadiene-acrylate rubbers, polyesters, phenol-formaldehyde resins, urea-formaldehyde resins, polyacrylates, polyalkylacrylate, polystyrene, polysulfides, polyurethanes and polyvinyl acetate resins.

A specific example of a rocket propellent with the scope of this invention comprises 70% oxidizer, 15% binder and 15% fuel, e.g., 70% difluorobrominium tetrafluoroborate, 15% butadiene-styrene rubber and 15% pentaborane.

In addition, difluorobrominium tetrafluoroborate has been utilized as a solute in an electrolytic cell to increase the specific conductivity of certain halogen fluorides. Conductivity measurement indicates that difluorobrominium tetrafluoroborate acts as a strong electrolyte in $BrF_3$ solution. The specific conductivities of 0.1 mole per liter of solid in $BrF_3$ solution at 25° C. was $1.2\times10^{-2}$ ohm$^{-1}$ cm.$^{-1}$ and ca. 0.5 mole per liter in a mixture of $BrF_3$ and $ClF_3$ solution, i.e., 0.83 mole fraction of $ClF_3$ in $BrF_3$, was $7.6\times10^{-3}$ ohm$^{-1}$ cm.$^{-1}$ at $-60°$ C.

Although we have described our invention with a certain degree of particularity, it is understood that said disclosure is made to set forth a specific embodiment of the invention and is not intended as a limitation thereof.

Having described our invention, we claim:

1. A propellant mixture comprising 70% difluorobrominium tetrafluoroborate; 15% of a binder component selected from the group consisting of butadiene-styrene and butadiene-acrylate rubbers, polyesters, phenol-formaldehyde resin, urea-formaldehyde resins, polyacrylates, polyalkyl-acrylates, polystyrene, polysulfides, polyurethanes and polyvinyl acetate resins; and 15% of a fuel component selected from the group consisting of pentaborane, monomethyl hydrazine, hydrazine and unsymmetrical dimethyl hydrazine, all of the above percentages being on a weight basis.

References Cited
UNITED STATES PATENTS 3,268,376   8/1966   Haldeman et al. _____ 149—19
3,287,416   11/1966  Bobinski et al. _____ 149—22

BENJAMIN R. PADGETT, Primary Examiner

U.S. Cl. X.R.

149—20, 22, 36